United States Patent
Shen et al.

(10) Patent No.: US 7,357,955 B2
(45) Date of Patent: *Apr. 15, 2008

(54) ACID BEVERAGE COMPOSITION UTILIZING AN AQUEOUS PROTEIN COMPONENT

(75) Inventors: Cheng Shen, Kirkwood, MO (US); Theresa Cox, St. Louis, MO (US); Daniel W. Brown, St. Louis, MO (US); Jonathan W. Delcamp, St. Louis, MO (US)

(73) Assignee: Solae, LLC, St. Louis, MO (US)

( * ) Notice: Subject to any disclaimer, the term of this patent is extended or adjusted under 35 U.S.C. 154(b) by 28 days.

This patent is subject to a terminal disclaimer.

(21) Appl. No.: 10/825,528

(22) Filed: Apr. 15, 2004

(65) Prior Publication Data

US 2005/0233052 A1   Oct. 20, 2005

(51) Int. Cl.
*A23L 2/00* (2006.01)

(52) U.S. Cl. .................. 426/590; 426/656; 426/634; 426/598

(58) Field of Classification Search ............... 426/656, 426/634, 590, 598
See application file for complete search history.

(56) References Cited

U.S. PATENT DOCUMENTS

| | | | |
|---|---|---|---|
| 3,694,221 A * | 9/1972 | Hoer et al. ............... 426/46 |
| 3,995,071 A | 11/1976 | Goodnight, Jr. et al. | |
| 4,039,696 A * | 8/1977 | Marquardt et al. ......... 426/598 |
| 4,091,120 A | 5/1978 | Goodnight, Jr. et al. | |
| 5,286,511 A | 2/1994 | Klavons et al. | |
| 5,658,609 A * | 8/1997 | Abboud et al. ............. 426/609 |
| 5,858,442 A * | 1/1999 | Payne et al. ................ 426/574 |
| 6,221,419 B1 * | 4/2001 | Gerrish ....................... 426/577 |
| 6,303,160 B1 * | 10/2001 | Laye et al. .................. 426/36 |
| 6,811,804 B2 * | 11/2004 | Patel et al. ................. 426/598 |
| 6,861,080 B2 * | 3/2005 | Kent et al. .................. 426/36 |
| 6,887,508 B2 | 5/2005 | Huang | |
| 6,890,578 B1 | 5/2005 | Takahasi et al. | |
| 2003/0203097 A1 | 10/2003 | Nunes et al. | |
| 2004/0258827 A1 * | 12/2004 | Shen ........................... 426/598 |
| 2005/0202147 A1 * | 9/2005 | Wong et al. ................ 426/598 |

FOREIGN PATENT DOCUMENTS

| | | |
|---|---|---|
| JP | 5308900 | 11/1993 |
| WO | WO 9956563 A | 11/1999 |
| WO | WO 02/49459 | 6/2002 |

* cited by examiner

*Primary Examiner*—Anthony Weier
(74) *Attorney, Agent, or Firm*—James L. Cordek; Holly M. Amjad

(57) ABSTRACT

This invention is directed to an acid beverage composition having a pH of from 3.0 to 4.5 having (A) a hydrated protein stabilizing agent; (B) at least one flavoring material; and (C) a slurry of an aqueous protein material prepared by a process including preparing an aqueous extract from a protein containing material, adjusting the pH of same to precipitate the protein material, separating the precipitated protein and forming a suspension of same in water, adjusting the pH of the suspension to a particular pH value, and pasteurizing same.

10 Claims, 4 Drawing Sheets

ACID BEVERAGE COMPOSITION UTILIZING AN AQUEOUS PROTEIN COMPONENT

FIELD OF THE INVENTION

This invention relates to a process for preparing a protein based acid beverage which is smooth, tasteful, palatable and has good storage stability. An aqueous protein is employed as the protein source in place of the typical dry protein.

BACKGROUND OF THE INVENTION

Juices and other acidic juice-like beverages are popular commercial products. Consumer demand for nutritional healthy beverages has led to the development of nutritional juice or juice-like beverages containing protein. The protein provides nutrition in addition to the nutrients provided by the components of the beverage. Recently it has been discovered that certain proteins have specific health benefits beyond providing nutrition. For example, soy protein has been recognized by the United States Food and Drug Administration as being effective to lower blood cholesterol concentrations in conjunction with a healthy diet. In response, there has been a growing consumer demand for acidic juice-like beverages containing proteins that provide such specific health benefits.

A hurdle to adding protein to acidic beverages, however, is the relative insolubility of proteins in an aqueous acidic environment. Most commonly used proteins, such as soy proteins and casein, have an isoelectric point at an acidic pH. Thus, the proteins are least soluble in an aqueous liquid at or near the pH of acidic beverages. For example, soy protein has an isoelectric point at pH 4.5 and casein has an isoelectric point at a pH of 4.7, while most common juices have a pH in the range of 3.7 to 4.0. As a result, protein tends to settle out as a sediment in an acidic protein-containing beverage—an undesirable quality in a beverage.

Protein stabilizing agents that stabilize proteins as a suspension in an aqueous acidic environment are used to overcome the problems presented by protein insolubility. Pectin is a commonly used protein stabilizing agent. Pectin, however, is an expensive food ingredient, and manufacturers of aqueous acidic beverages containing protein desire less expensive stabilizers, where the amount of required pectin is either reduced or removed in favor of less expensive stabilizing agents.

The majority of protein based juice drinks are made from dry protein sources including casein, whey and soy protein. The advantages of a dry protein source are the small storage volume, the ease of shipment and the ease of handling during production, since the protein is spray dried to obtain a powder. However, dry protein powders undergo high heat treatment during the spray drying process and this in turn leads to a loss of some functionality, especially on solubility in the juice drink. Solubility is a key element for a stable acid protein juice drink.

Soy milk is an alternative raw material that could be used in juice drinks, however, the low protein content of soy milk coupled with its beany flavor, limit the application of soy milk in juice drinks.

The advantage of this invention is that while a soy protein is employed for acid beverages, the soy protein is not subjected to the spray drying step. Liquid soy protein that is obtained prior to the spray drying process has a high protein concentration and full functionality. As such, it can be used in acid beverages that would have a high degree of stability over a long period of storage time at ambient temperature. A liquid soy protein will retain all its functionality, since there is no phase transition generated by the spray drying process. The spray drying step tends to decrease the solubility of the protein in the acid beverage which then generates a large amount of insoluble particles in the acid beverage.

An advantage of using liquid soy protein is that the lower density, in comparison to the dry protein product, makes a more suspension stable acid beverage. The increased cost of transporting a liquid protein will be offset, in part, by the elimination of the spray drying step.

U.S. Pat. No. 3,995,071 (Goodnight, Jr. et al., Nov. 30, 1976) provides a process for the preparation of an improved purified soy protein having a low phytic acid content. A feature of this reference involves direct incorporation of the aqueous protein into special dietary and food products since it has been found that improved nutritional qualities, functionality (physical characteristics) and flavor are achieved when an aqueous protein is incorporated directly into the final composition as a liquid rather than employing an intermediate drying step prior to constitution with other ingredients.

U.S. Pat. No. 5,286,511 (Klavons et al., Feb. 15, 1994) provides a beverage such as orange juice that is clouded by a suspension of soy protein particles, where the protein particles are prevented from aggregating to the point of settling out by pectin. Pectin inhibits the protein from settling by adsorbing to individual protein particles and imparting an overall negative charge to the protein particles, resulting in repulsion of the particles from one another, and thereby preventing the protein particles from aggregating and settling out of the suspension. Pectin also increases the viscosity of the beverage, which helps stabilize protein particles against gravitational forces.

U.S. Pat. No. 6,221,419 (Gerrish, Apr. 24, 2001) relates to a pectin for stabilizing proteins particularly for use in stabilizing proteins present in aqueous acidified milk drinks. It must be understood that the inclusion of pectin has both desirable and undesirable effects on the properties of acidified milk drinks. While pectin can act as a stabilizer against sedimentation of casein particles or whey separation, it can have the disadvantage of increasing the viscosity of the drink due to its cross-linking with naturally co-present calcium cations rendering the drink unpalatable. It will be seen that in the absence of pectin, there is significant sedimentation in the case of both drinks caused by the instability of the casein particles which also results in relatively high viscosity. After a certain concentration of pectin has been added, the casein particles become stabilized against sedimentation after which increasing the pectin concentration has little effect on sedimentation. Turning to the viscosity of the drinks, this also significantly drops on stabilization of the casein particles but then almost immediately begins to rise again due to cross-linking of the excess pectin added by the co-present calcium cations. This increased viscosity is undesirable as it leads to the beverage having poor organoleptic properties. This range may be as narrow as only 0.06% by weight of pectin based upon the beverage weight as a whole. Below this working range, sedimentation is a significant problem, whereas above it, the viscosity of the beverage is undesirably high.

SUMMARY OF THE INVENTION

This invention is directed to an acid beverage composition, comprising;
(A) a hydrated protein stabilizing agent;
(B) at least one flavoring material comprising a fruit juice, a vegetable juice, citric acid, malic acid, tartaric acid, lactic acid, ascorbic acid, glucono delta lactone or phosphoric acid; and
(C) a slurry of an aqueous protein material wherein the slurry of the aqueous protein material is prepared by a process, comprising;
  (1) preparing an aqueous extract from a protein containing material,
  (2) adjusting the pH of the aqueous extract to a value of from about 4 to about 5 to precipitate the protein material,
  (3) separating the precipitated protein material and forming a suspension of the precipitated protein material in water,
  (4) adjusting the pH of the suspension to a value of from about 4.0 to about 6.0 to form a slurry of an aqueous protein material, and optionally
  (5) pasteurizing the slurry of the aqueous protein material;
wherein the acid beverage composition has a pH of from 3.0 to 4.5.

Also disclosed are several processes for preparing an acid beverage composition. The first process comprises;

forming a preblend (I) by mixing
(A) a hydrated protein stabilizing agent and
(B) at least one flavoring material comprising a fruit juice, a vegetable juice, citric acid, malic acid, tartaric acid, lactic acid, ascorbic acid, glucono delta lactone or phosphoric acid; and mixing preblend (I) and
(C) a slurry of an aqueous protein material wherein the slurry of the aqueous protein material is prepared by a process, comprising;
  (1) preparing an aqueous extract from a protein containing material,
  (2) adjusting the pH of the aqueous extract to a value of from about 4 to about 5 to precipitate the protein material,
  (3) separating the precipitated protein material and forming a suspension of the precipitated protein material in water,
  (4) adjusting the pH of the suspension to a value of from about 4.0 to about 6.0 to form a slurry of an aqueous protein material, and
  (5) pasteurizing the slurry of the aqueous protein material;

to form a blend and pasteurizing and homogenizing the blend;

wherein the acid beverage composition has a pH of from 3.0 to 4.5.

The second process for preparing an acid beverage composition comprises; forming a preblend (I) by mixing
(A) a hydrated protein stabilizing agent and
(B) at least one flavoring material comprising a fruit juice, a vegetable juice, citric acid, malic acid, tartaric acid, lactic acid, ascorbic acid, glucono delta lactone or phosphoric acid; and forming a preblend (II) by mixing
(A) a hydrated protein stabilizing agent; and
(C) a slurry of an aqueous protein material wherein the slurry of the aqueous protein material is prepared by a process, comprising;
  (1) preparing an aqueous extract from a protein containing material,
  (2) adjusting the pH of the aqueous extract to a value of from about 4 to about 5 to precipitate the protein material,
  (3) separating the precipitated protein material and forming a suspension of the precipitated protein material in water,
  (4) adjusting the pH of the suspension to a value of from about 4.0 to about 6.0 to form a slurry of an aqueous protein material, and
  (5) pasteurizing the slurry of the aqueous protein material; and mixing preblend (I) and preblend (II) to form a blend; and pasteurizing and homogenizing the blend;

wherein the acid beverage composition has a pH of from 3.0 to 4.5.

The third process for preparing an acid beverage composition, comprises; forming a preblend (III) by mixing
(A) a hydrated protein stabilizing agent and
($C^1$) a slurry of an aqueous protein material wherein the slurry of the aqueous protein material is prepared by a process, comprising;
  (1) preparing an aqueous extract from a protein containing material,
  (2) adjusting the pH of the aqueous extract to a value of from about 4 to about 5 to precipitate the protein material,
  (3) separating the precipitated protein material and forming a suspension of the precipitated protein material in water,
  (4) adjusting the pH of the suspension to a value of from about 4.0 to about 6.0 to form a slurry of an aqueous protein material; and mixing preblend (III) with
(B) at least one flavoring material comprising a fruit juice, a vegetable juice, citric acid, malic acid, tartaric acid, lactic acid, ascorbic acid, glucono delta lactone or phosphoric acid;

to form a blend; and pasteurizing and homogenizing the blend;

wherein the acid beverage composition has a pH of from 3.0 to 4.5.

DETAILED DESCRIPTION OF THE INVENTION

Figure 1:
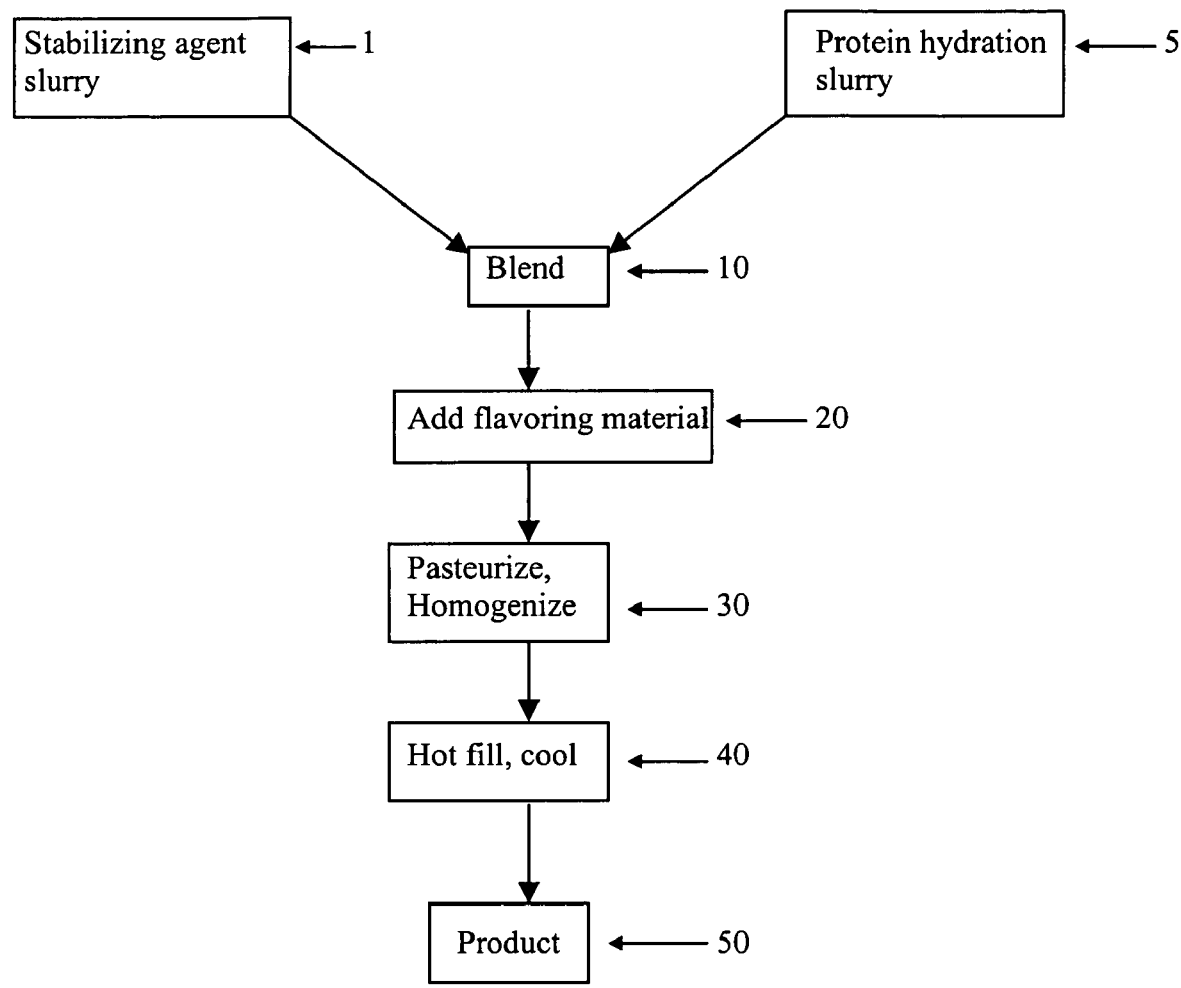
FIG. 1 is a block flow diagram of an industry wide process for producing a typical protein containing acid beverage wherein a dry protein is hydrated as a protein slurry and a dry stabilizing agent is hydrated as a stabilizing agent slurry and the two slurries are blended together and the remaining ingredients added followed by pasteurization and homogenization.

A protein based acid beverage is normally stabilized by a stabilizing agent that provides a stable suspension through possible steric stabilization and electrostatic repulsive mechanism. FIG. 1 refers to the normal processing conditions of protein stabilized acid beverages. At 1, a stabilizing agent is either hydrated separately into a 2-3% slurry or blended with sugar to give a stabilizing agent slurry having a pH of 3.5. At 5, dry protein powder is first dispersed in water at ambient temperature and hydrated at an elevated temperature for a period of time. The pH at 5 is about neutral. The hydrated stabilizing agent slurry from 1 and the hydrated protein slurry from 5 are mixed together at 10 for 10 minutes under agitation. The pH at 10 is about 7. Other ingredients such as additional sugar, fruit juices or vegetable juice, and various acids such as phosphoric acid, ascorbic acid citric acid, etc., are added at 20 to bring the pH to about 3.8. The contents are pasteurized at 195° F. for 30 seconds and then homogenized first at 2500 pounds per square inch and then at 500 pounds per square inch at 30. Containers are hot filled and cooled at 40 to give the product at 50 with a pH of 3.8. The problem with this method is that after the stabilizing agent is mixed with the protein, the pH of the blend is close to neutral, and the stabilizing agent is potentially degraded by beta-elimination, especially under heat. This causes a decrease in the molecular weight of the stabilizing agent and the ability of the stabilizing agent to stabilize the proteins when the pH is later lowered even more is greatly reduced. The stabilizing agent is only stable at room temperature. As the temperature increases, beta elimination begins, which results in chain cleavage and a very rapid loss of the ability of the stabilizing agent to provide a stable suspension.

Figure 2:
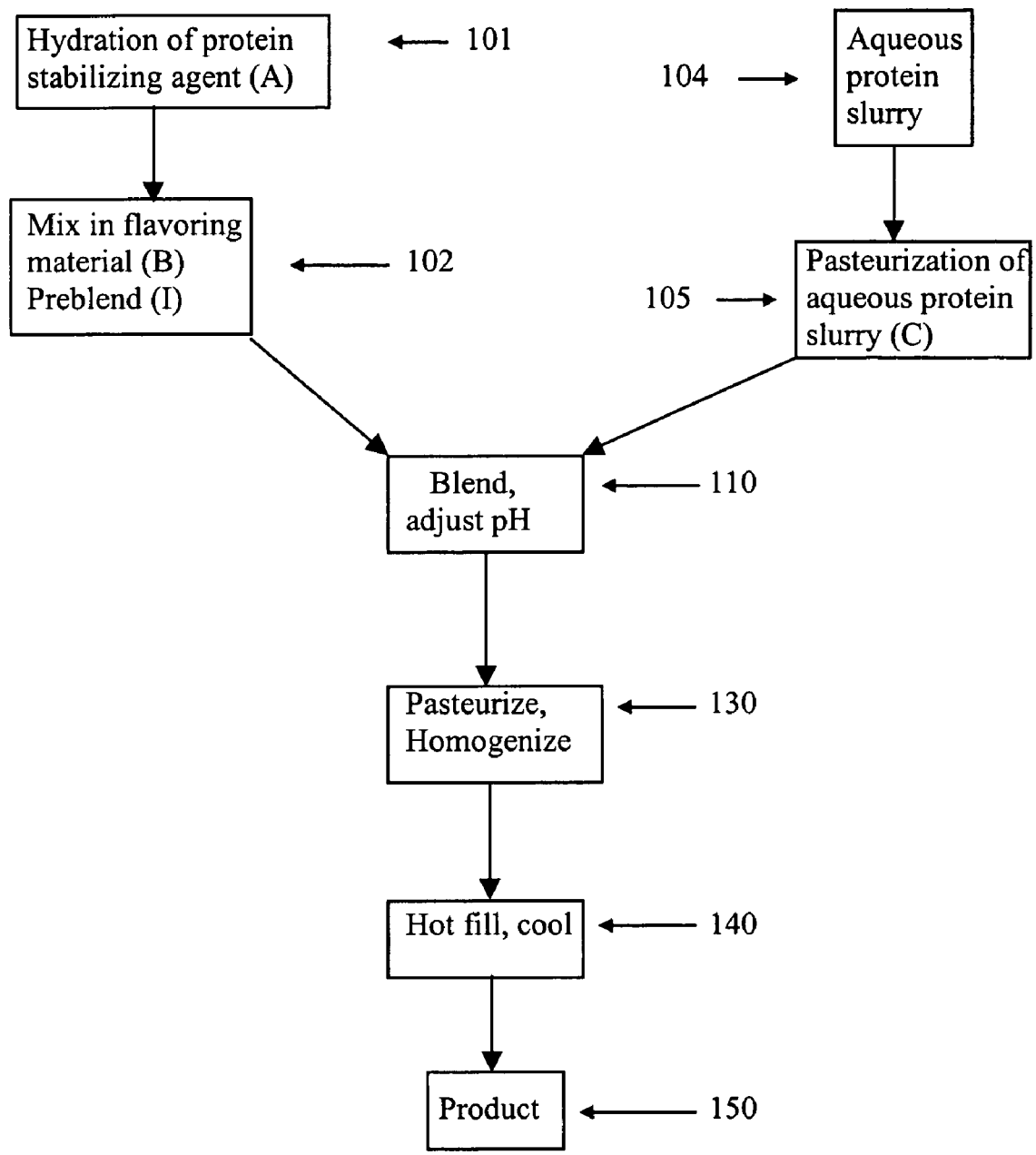
FIG. 2 is a block flow diagram of the first process of the invention for producing a protein containing acid beverage wherein a dry stabilizing agent is hydrated as a stabilizing agent slurry and a flavoring material is added to the stabilizing agent slurry to form a preblend (I) slurry. A non-dried, aqueous protein as a protein slurry (Component (C)) is prepared. The preblend (I) slurry and the non-dried, aqueous protein slurry are blended together followed by pasteurization and homogenization in accordance with the principles of the invention.
Figure 3:
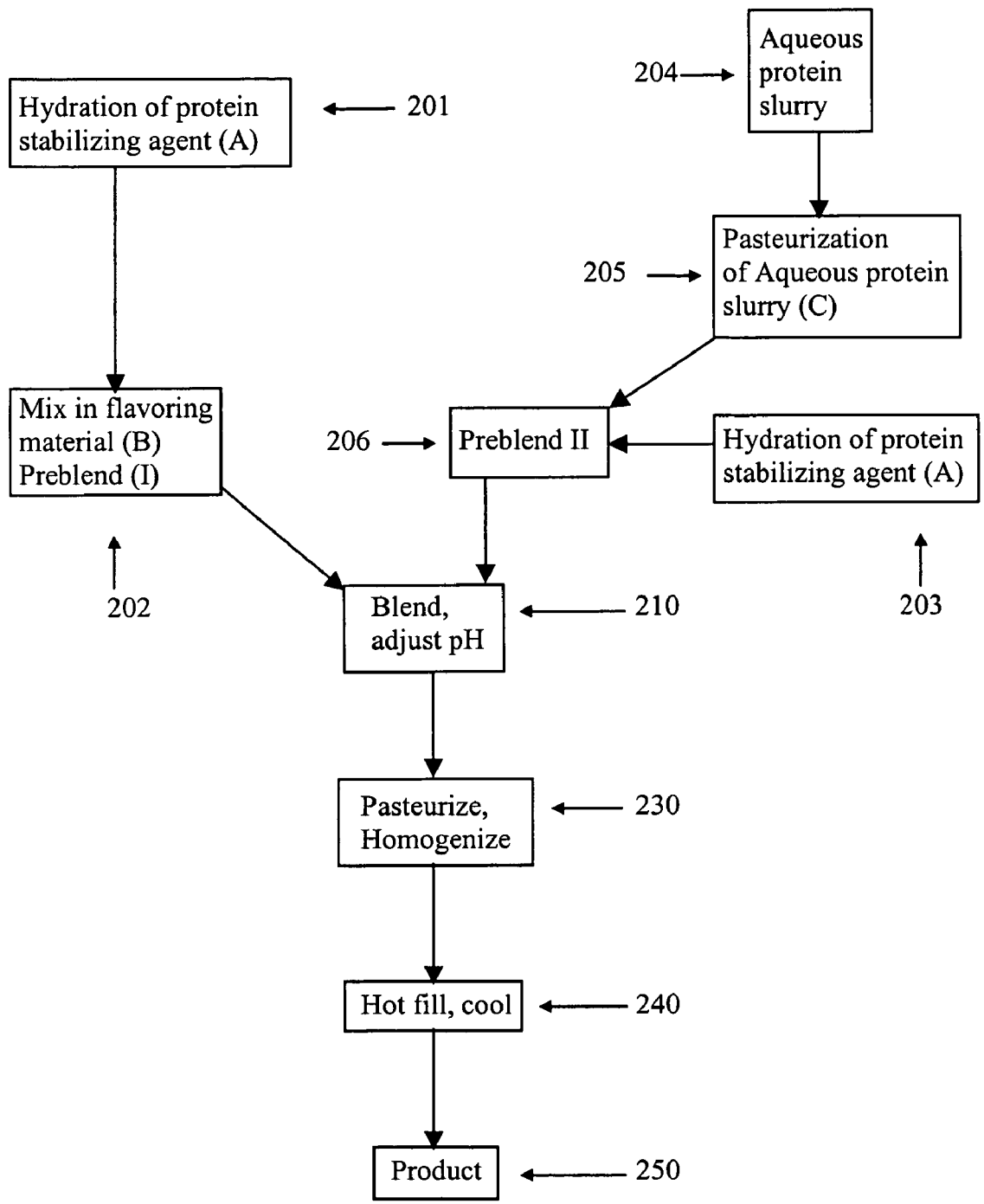
FIG. 3 is a block flow diagram of the second process of the invention for producing a protein containing acid beverage wherein a dry stabilizing agent slurry is hydrated as a stabilizing agent slurry and a flavoring material is added to the stabilizing agent slurry to form a preblend (I) slurry. A non-dried, aqueous protein as a protein slurry is prepared and a portion of a dry stabilizing agent slurry is added to form a preblend (II) slurry. The preblend (I) slurry and the preblend (II) slurry are blended together followed by pasteurization and homogenization in accordance with the principles of the invention.
Figure 4:
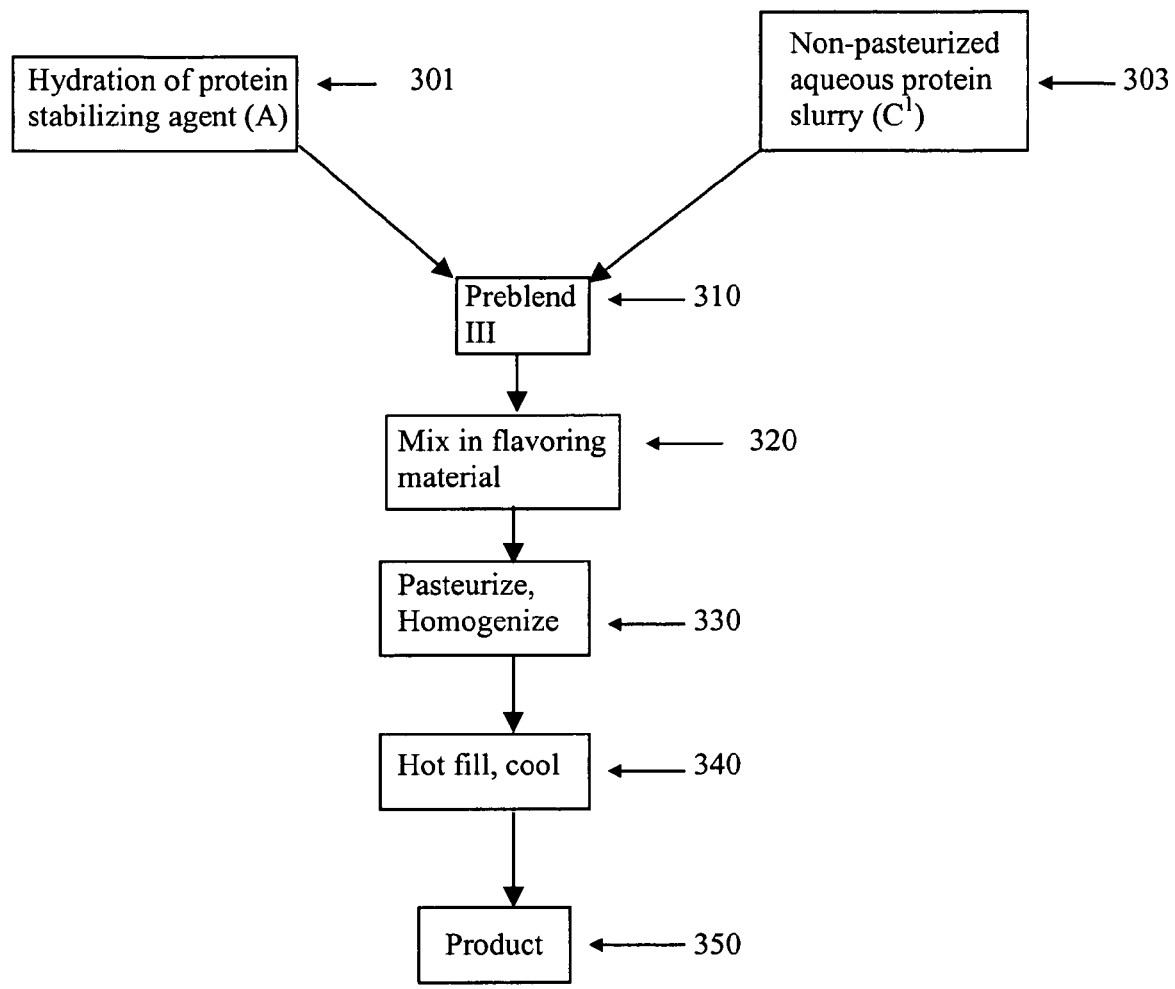
FIG. 4 is a block flow diagram of the third process of the invention for producing a protein containing acid beverage wherein a dry stabilizing agent is hydrated as a stabilizing agent slurry (A) and a non-dried, non-pasteurized aqueous protein as a protein slurry ($C^1$) is added to the stabilizing agent slurry to form a preblend (III) slurry. The preblend (III) slurry and the flavoring material (B) are blended together followed by pasteurization and homogenization in accordance with the principles of the invention.

In the present invention, a hydrated protein stabilizing agent (A) and a flavoring material (B) are combined as a preblend (I) and combined with either a slurry of a non-dried, aqueous protein material (C) or a preblend (II) of a hydrated protein stabilizing agent (A) and a slurry of a non-dried, aqueous protein material (C). FIG. 2 and FIG. 3 refer to these processes. In FIG. 4, the hydrated protein stabilizing agent (A) and a non-dried, non-pasteurized aqueous protein slurry ($C^1$) are combined as preblend (III) and combined with the flavoring material (B).

FIG. 2 outlines the first process of this invention. A stabilizing agent is hydrated into a 0.5-10% dispersion with or without sugar at 101. The pH at 101 is 3.5. At 102, the flavoring material (B) such as additional sugar, fruit juices, vegetable juices, various acids such as phosphoric acid, ascorbic acid, citric acid, etc. are added and the contents mixed at an elevated temperature to form preblend (I). An aqueous protein slurry is prepared at 104. This slurry is not subjected to spray drying conditions. The slurry is pasteurized at 105 to give component (C). The pH at 105 is from about 4 to about 6. The pasteurized slurry from 105 and preblend (I) from 102 are blended together at 110 with additional acid to a pH of 3.8. At 130, the contents are pasteurized at a temperature of 180° F. for 30 seconds and homogenized in two stages—a high pressure stage of 2500 pounds per square inch and then a low pressure stage of 500 pounds per square inch Containers are hot filled and cooled at 140 to give the product at 150 with a pH of 3.8.

FIG. 3 outlines the second process of this invention. In FIG. 3, an aqueous protein slurry is prepared at 204. This slurry is not subjected to spray drying conditions. The slurry is pasteurized at 205 to give component (C). The pH at 205 is from about 4 to about 6. A portion of the total stabilizing agent, component (A), (about 30%) is hydrated at 203, mixed briefly and then added to component (C) to form preblend (II) at 206. The pH at 206 is about 6.5. The remaining stabilizing agent is hydrated without sugar at 201. The pH at 201 is 3.5. At 202, the flavoring material (B) such as additional sugar, fruit juices, vegetable juices, various acids such as phosphoric acid, ascorbic acid, citric acid, etc. are added and the contents mixed at an elevated temperature to form preblend (I). The slurry of preblend (I) from 202 and the slurry of preblend (II), from 206 are blended together at 210 with additional acid to a pH of 3.8. At 230, the contents are pasteurized at a temperature of 195° F. for 30 seconds and homogenized in two stages—the high pressure stage of 2500 pounds per square inch and then the low pressure stage of 500 pounds per square inch. Containers are hot filled and cooled at 240 to give the product at 250 with a pH of 3.8.

FIG. 4 outlines the third process of this invention. In FIG. 4, an aqueous protein slurry that is not pasteurized is prepared at 303 to give ($C^1$). This slurry is not subjected to spray drying conditions. The pH at 303 is from about 4 to about 6. A stabilizing agent is hydrated into a 0.5-10% slurry with or without sugar at 301 to a pH of 3.5 and then added to component ($C^1$) to form preblend (III) at 310. At 320, the flavoring material (B) such as additional sugar, fruit juices, vegetable juices, various acids such as phosphoric acid, ascorbic acid, citric acid, etc. are added and the contents are mixed. At 330, the contents are pasteurized at a temperature of 195° F. for 30 seconds and homogenized in two stages—the high pressure stage of 2500 pounds per square inch and then the low pressure stage of 500 pounds per square inch. Containers are hot filled and cooled at 340 to give the product at 350 with a pH of 3.8.

Component (A)

The present invention employs a stabilizing agent and the stabilizing agent is a hydrocolloid comprising alginate, microcrystalline cellulose, jellan gum, tara gum, carrageenan, guar gum, locust bean gum, xanthan gum, cellulose gum and pectin. A preferred hydrocolloid is pectin. As used herein, the term "pectin" means a neutral hydrocolloid that consists mainly of partly methoxylated polygalacturonic acid. The term "high methoxyl pectin" as used herein means a pectin having a degree of methoxyl esterification of fifty percent (50%) or greater. High methoxyl (HM) pectins useful in the present invention are commercially available. One supplier is Copenhagen Pectin A/S, a division of Hercules Incorporated, DK-4623, Lille Skensved, Denmark. Their products are identified as Hercules YM100L, Hercules YM100H, Hercules YM115L, Hercules YM115H and Hercules YM150H. Hercules YM100L contains about 56% galacturonic acid, where about 72% (±2%) of the galacturonic acid is methylated. Another supplier is Danisco A/S of Copenhagen, Denmark and they supply AMD783.

It is necessary to hydrate the stabilizing agent (A), prior to preparing the acid beverage. Water is added in sufficient quantity to form a slurry in order to hydrate the stabilizing agent. The slurry is mixed at room temperature under high shear and heated to 140-180° F. for an additional 10 minutes. At this solids concentration, the most complete hydration is obtained in the stabilizing agent. Thus, the water in the slurry is used most efficiently at this concentration. A sweetener may be added at this point or later or a portion of the sweetener added here and also added later. Preferred sweeteners comprise sucrose, corn syrup, and may include dextrose and high fructose corn syrup and artificial sweeteners.

Component (B)

A protein material by itself can have an undesired aftertaste or undesired flavors. The function of the flavoring material (B) is to mask any adverse flavors of the protein material (C) and to give a pleasant taste to the acid beverage composition. The flavoring material (B) comprises a fruit juice, a vegetable juice, citric acid, malic acid, tartaric acid, lactic acid, ascorbic acid, glucone delta lactone, phosphoric acid or combinations thereof.

As a juice, the fruit and/or vegetable may be added in whole, as a liquid, a liquid concentrate, a puree or in another modified form. The liquid from the fruit and/or vegetable may be filtered prior to being used in the juice product. The fruit juice can include juice from tomatoes, berries, citrus fruit, melons and/or tropical fruits. A single fruit juice or fruit juice blends may be used. The vegetable juice can include a number of different vegetable juices. Examples of a few of the many specific juices which may be utilized in the present invention include juice from berries of all types, currants, apricots, peaches, nectarines, plums, cherries, apples, pears, oranges, grapefruits, lemons, limes, tangerines, mandarin, tangelo, bananas, pineapples, grapes, tomatoes, rhubarbs, prunes, figs, pomegranates, passion fruit, guava, kiwi, kumquat, mango, avocados, all types of melon, papaya, turnips, rutabagas, carrots, cabbage, cucumbers, squash, celery, radishes, bean sprouts, alfalfa sprouts, bamboo shoots, beans and/or seaweed. As can be appreciated, one or more fruits, one or more vegetables, and/or one or more fruits and vegetables, can be included in the acid beverage to obtain the desired flavor of the acid beverage.

Fruit and vegetable flavors can also function as the flavoring material (B). Fruit flavoring has been found to neutralize the aftertaste of protein materials. The fruit flavoring may be a natural and/or artificial flavoring. As can be appreciated, the fruit flavoring is best when used with other flavoring materials such as vegetable flavoring to enhance the characterizing flavor of the acid beverage and also to mask any undesired flavor notes that may derive from the protein material.

Component (C)

The protein material is a slurry of an aqueous protein material wherein the slurry of the aqueous protein material is prepared by a process, comprising;
  (1) preparing an aqueous extract from a protein containing material,
  (2) adjusting the pH of the aqueous extract to a value of from about 4 to about 5 to precipitate the protein material,
  (3) separating the precipitated protein material and forming a suspension of the precipitated protein material in water,
  (4) adjusting the pH of the suspension to a value of from about 4.0 to about 6.0 to form a slurry of an aqueous protein material, and optionally
  (5) pasteurizing the slurry of the aqueous protein material.

Within (C)(5), when pasteurization occurs, the component generated is Component (C). When (C)(5) is non-existent, meaning there is no pasteurization step, the component generated is Component ($C^1$).

The protein material may be any vegetable or animal protein that is at least partially insoluble in an aqueous acidic liquid, preferably in an aqueous acidic liquid having a pH of from 3.0 to 5.5, and most preferably in an aqueous acidic liquid having a pH of from 3.5 to 4.5. As used herein a "partially insoluble" protein material is a protein material that contains at least 10% insoluble material, by weight of the protein material, at a specified pH. Preferred protein materials useful in the composition of the present invention include soy protein materials, casein or caseinates, corn protein materials—particularly zein, and wheat gluten. Preferred proteins also include dairy whey protein (especially sweet dairy whey protein), and non-dairy-whey proteins such as bovine serum albumin, egg white albumin, and vegetable whey proteins (i.e., non-dairy whey protein) such as soy protein.

It is necessary that the protein material does not undergo a spray drying step. Protein materials for this invention are not dry protein materials, but rather protein materials that are still in an aqueous form. That is, a protein that has been pasteurized, but not dried. Dry protein powders that have undergone high heat treatment during the spray drying process cause a loss of some functionality, especially on solubility in the juice drink. Solubility is a key element for a stable acid protein juice drink.

Soybean protein materials which are useful with the present invention are soy flour, soy concentrate, and, most preferably, soy protein isolate. The soy flour, soy concentrate, and soy protein isolate are formed from a soybean starting material which may be soybeans or a soybean derivative. Preferably the soybean starting material is either soybean cake, soybean chips, soybean meal, soybean flakes, or a mixture of these materials. The soybean cake, chips, meal, or flakes may be formed from soybeans according to conventional procedures in the art, where soybean cake and soybean chips are formed by extraction of part of the oil in soybeans by pressure or solvents, soybean flakes are formed by cracking, heating, and flaking soybeans and reducing the oil content of the soybeans by solvent extraction, and soybean meal is formed by grinding soybean cake, chips, or flakes.

The soy flour, soy concentrate and soy protein isolate are described below as containing a protein range based upon a "moisture free basis" (mfb), which denotes a drying step. It is not known what the protein range is for a soy flour, soy concentrate and soy protein isolate in the aqueous state. However, if the soy flour, soy concentrate and soy protein isolate were to be dried, they would have the protein ranges so indicated on a moisture free basis.

Soy flour, as that term is used herein, refers to a comminuted form of defatted soybean material, preferably containing less than 1% oil, formed of particles having a size such that the particles can pass through a No. 100 mesh (U.S. Standard) screen. The soy cake, chips, flakes, meal, or mixture of the materials are comminuted into a soy flour using conventional soy grinding processes. Soy flour has a soy protein content of about 49% to about 65% on a moisture free basis (mfb). Preferably the flour is very finely ground, most preferably so that less than about 1% of the flour is retained on a 300 mesh (U.S. Standard) screen.

Soy concentrate, as the term is used herein, refers to a soy protein material containing about 65% to about 72% of soy protein (mfb). Soy concentrate is preferably formed from a commercially available defatted soy flake material from which the oil has been removed by solvent extraction. The soy concentrate is produced by an acid leaching process or by an alcohol leaching process. In the acid leaching process, the soy flake material is washed with an aqueous solvent having a pH at about the isoelectric point of soy protein, preferably at a pH of about 4.0 to about 5.0, and most preferably at a pH of about 4.4 to about 4.6. The isoelectric wash removes a large amount of water soluble carbohydrates and other water soluble components from the flakes, but removes little of the protein and fiber, thereby forming a soy concentrate. The soy concentrate is not dried after the isoelectric wash. In the alcohol leaching process, the soy flake material is washed with an aqueous ethyl alcohol solution wherein ethyl alcohol is present at about 60% by weight. The protein and fiber remain insoluble while the carbohydrate soy sugars of sucrose, stachyose and raffinose are leached from the defatted flakes. The soy soluble sugars in the aqueous alcohol are separated from the insoluble protein and fiber. The insoluble protein and fiber in the aqueous alcohol phase are not dried.

Soy protein isolate, as the term is used herein, refers to a soy protein material containing at least about 90% or greater protein content, and preferably from about 92% or greater protein content (mfb). Soy protein isolate is typically produced from a starting material, such as defatted soybean material, in which the oil is extracted to leave soybean meal or flakes. More specifically, the soybeans may be initially crushed or ground and then passed through a conventional oil expeller. It is preferable, however, to remove the oil contained in the soybeans by solvent extraction with aliphatic hydrocarbons, such as hexane or azeotropes thereof, and these represent conventional techniques employed for the removal of oil. The defatted soy protein material or soybean flakes are then placed in an aqueous bath to provide a mixture having a pH of at least about 6.5 and preferably between about 7.0 and 10.0 in order to extract the protein. Typically, if it is desired to elevate the pH above 6.7, various alkaline reagents such as sodium hydroxide, potassium hydroxide and calcium hydroxide or other commonly accepted food grade alkaline reagents may be employed to elevate the pH. A pH of above about 7.0 is generally preferred, since an alkaline extraction facilitates solubilization of the protein. Typically, the pH of the aqueous extract of protein will be at least about 6.5 and preferably about 7.0 to 10.0. The ratio by weight of the aqueous extractant to the vegetable protein material is usually between about 20 to 1 and preferably a ratio of about 10 to 1. In an alternative embodiment, the vegetable protein is extracted from the milled, defatted flakes with water, that is, without a pH adjustment.

It is also desirable in obtaining the soy protein isolate used in the present invention, that an elevated temperature be employed during the aqueous extraction step, either with or without a pH adjustment, to facilitate solubilization of the protein, although ambient temperatures are equally satisfactory if desired. The extraction temperatures which may be employed can range from ambient up to about 120° F. with a preferred temperature of 90° F. The period of extraction is further non-limiting and a period of time between about 5 to 120 minutes may be conveniently employed with a preferred time of about 30 minutes. Following extraction of the vegetable protein material, the aqueous extract of protein can be stored in a holding tank or suitable container while a second extraction is performed on the insoluble solids from the first aqueous extraction step. This improves the efficiency and yield of the extraction process by exhaustively extracting the protein from the residual solids from the first step.

The combined, aqueous protein extracts from both extraction steps, without the pH adjustment or having a pH of at least 6.5, or preferably about 7.0 to 10, are then precipitated by adjustment of the pH of the extracts to, at or near the isoelectric point of the protein to form an insoluble curd precipitate. The actual pH to which the protein extracts are adjusted will vary depending upon the vegetable protein material employed but insofar as soy protein, this typically is between about 4.0 and 5.0. The precipitation step may be conveniently carried out by the addition of a common food grade acidic reagent such as acetic acid, sulfuric acid, phosphoric acid, hydrochloric acid or with any other suitable acidic reagent. The soy protein precipitates from the acidified extract, and is then separated from the extract. The separated protein may be washed with water to remove residual soluble carbohydrates and ash from the protein material and the residual acid can be neutralized to a pH of from about 4.0 to about 6.0 by the addition of a basic reagent such as sodium hydroxide or potassium hydroxide to form a slurry of an aqueous protein material. At this point the aqueous protein material is optionally subjected to a pasteurization step. The pasteurization step kills microorganisms that may be present. Pasteurization is carried out at a temperature of at least 180° F. for at least 10 seconds, at a temperature of at least 190° F. for at least 30 seconds or at a temperature of at least 195° F. for at least 60 seconds. If pasteurization is not carried out, the aqueous protein is defined as component ($C^1$). With pasteurization, the aqueous protein is defined as Component (C). Typically, at this point, the separated protein is then dried using conventional drying means to form a soy protein isolate. However, in the present invention, it is necessary that the soy protein isolate be an aqueous soy protein isolate.

Preferably the aqueous protein material used in the present invention, is modified to enhance the characteristics of the protein material. The modifications are modifications which are known in the art to improve the utility or characteristics of a protein material and include, but are not limited to, denaturation and hydrolysis of the protein material.

The aqueous protein material may be denatured and hydrolyzed to lower the viscosity. Chemical denaturation and hydrolysis of protein materials is well known in the art and typically consists of treating an aqueous protein material with one or more alkaline reagents in an aqueous solution under controlled conditions of pH and temperature for a period of time sufficient to denature and hydrolyze the protein material to a desired extent. Typical conditions utilized for chemical denaturing and hydrolyzing a protein material are: a pH of up to about 10, preferably up to about 9.7; a temperature of about 50° C. to about 80° C. and a time period of about 15 minutes to about 3 hours, where the denaturation and hydrolysis of the aqueous protein material occurs more rapidly at higher pH and temperature conditions.

Hydrolysis of the aqueous protein extract may also be effected by treating the aqueous protein extract with an enzyme capable of hydrolyzing the protein. Many enzymes are known in the art which hydrolyze protein materials, including, but not limited to, fungal proteases, pectinases, lactases, and chymotrypsin. Enzyme hydrolysis is effected by adding a sufficient amount of enzyme to an aqueous dispersion of the aqueous protein material, typically from about 0.1% to about 10% enzyme by weight of the aqueous protein extract, and treating the enzyme and aqueous protein extract at a temperature, typically from about 5° C. to about 75° C., and a pH, typically from about 3 to about 9, at which the enzyme is active for a period of time sufficient to hydrolyze the aqueous protein extract. After sufficient hydrolysis has occurred the enzyme is deactivated by heating to a temperature above 75° C., and the protein extract is precipitated from the aqueous extract by adjusting the pH of the solution to about the isoelectric point of the protein material. Enzymes having utility for hydrolysis in the present invention include, but are not limited to, bromolein and alcalase.

Mineral enrichment or fortification of the soy protein material is also desirable. The aqueous protein material is modified by the inclusion of an alkaline earth metal phosphate either as magnesium phosphate or calcium phosphate. Calcium phosphate is preferred. Typically phosphoric acid is quickly added to an aqueous slurry of an alkaline earth metal hydroxide such as calcium hydroxide while employing ultrasonication or homogenization. The ultrasonication and homogenization serve to reduce the particle size of the formed calcium phosphate and also provides mechanical energy such that all the calcium hydroxide erects with the phosphoric acid.

Casein protein materials useful in the process of the present invention are prepared by coagulation of a curd from skim milk. The casein is coagulated by acid coagulation, natural souring, or rennet coagulation. To effect acid coagulation of casein, a suitable acid, preferably hydrochloric acid, is added to milk to lower the pH of the milk to around the isoelectric point of the casein, preferably to a pH of from 4.0 to 5.0, and most preferably to a pH of from 4.6 to 4.8. To effect coagulation by natural souring, milk is held in vats to ferment, causing lactic acid to form. The milk is fermented for a sufficient period of time to allow the formed lactic acid to coagulate a substantial portion of the casein in the milk. To effect coagulation of casein with rennet, sufficient rennet is added to the milk to precipitate a substantial portion of the casein in the milk. Acid coagulated, naturally soured, and rennet precipitated casein are all commercially available from numerous manufacturers or supply houses.

Corn protein materials that are useful in the present invention include corn gluten meal, and most preferably, zein. Corn gluten meal is obtained from conventional corn refining processes, and is commercially available. Corn gluten meal contains about 50% to about 60% corn protein and about 40% to about 50% starch. Zein is a commercially available purified corn protein which is produced by extracting corn gluten meal with a dilute alcohol, preferably dilute isopropyl alcohol.

Wheat protein materials that are useful in the process of the present invention include wheat gluten. Wheat gluten is obtained from conventional wheat refining processes, and is commercially available.

The below Examples 1-5, as part of the present invention, are directed to the preparation of either Component (C) or Component ($C^1$).

EXAMPLE 1

To an extraction tank is added 100 pounds of defatted soybean flakes and 1000 pounds water. The contents are heated to 90° F. and sufficient calcium hydroxide is added to adjust the pH to 9.7. This provides a weight ratio of water to flakes of 10:1. The flakes are separated from the extract and reextracted with 600 lbs. of water having a pH of 9.7 and a temperature of 90° F. This second extraction step provides a weight ratio of water to flakes of 6:1. The flakes are removed by centrifugation, and the first and second extracts are combined and adjusted to a pH of 4.5 with either hydrochloric acid or phosphoric acid, which forms a precipitated protein curd and a soluble aqueous whey. The acid precipitated water insoluble curd is separated from the aqueous whey by centrifuging and washing in a CH-14 centrifuge at a speed of 4,000 rpm and a Sharples P3400 centrifuge at a speed of 3,000 rpm. Protein curds are re-suspended in water at a 10-12% solid concentration and the pH is adjusted to 5.2 with sodium hydroxide to partially solubilize the protein. The product is an aqueous protein that has not been pasteurized.

EXAMPLE 2

To an extraction tank is added 100 pounds of defatted soybean flakes and 600 pounds water. The contents are heated to 90° F. and sufficient calcium hydroxide is added to adjust the pH to 9.7. This provides a weight ratio of water to flakes of 6:1. The flakes are separated from the extract and reextracted with 400 lbs. of water having a pH of 9.7 and a temperature of 90° F. This second extraction step provides a weight ratio of water to flakes of 4:1. The flakes are removed by centrifugation, and the first and second extracts are combined and adjusted to a pH of 4.5 with phosphoric acid, which forms a precipitated protein curd and a soluble aqueous whey. The acid precipitated water insoluble curd is separated from the aqueous whey by centrifuging and washing in a CH-14 centrifuge at a speed of 4,000 rpm and a Sharples P3400 centrifuge at a speed of 3,000 rpm. Protein curds are re-suspended in water at a 10-12% solid concentration to give a diluted curd. Added to the diluted curd is an aqueous blend of sodium hydroxide and potassium hydroxide to adjust the pH to 9.0. The alkali treated material is heated to about 145° F. and a 10% solution of Alcalase is added. The enzyme treated slurry is mixed for 30 minutes and the pH is maintained at 9.0 with the alkali blend. After an additional 22 minute hold after the completion of the alkali treatment, a 0.1% bromolain solution is added. After a hold time of 22 minutes, a mixture of hydrochloric acid and phosphoric acid is added to adjust the pH to 5.54. The contents are pasteurized at 305° F. for 9 seconds to give an aqueous protein material.

EXAMPLE 3

The procedure of Example 1 is repeated with the following exception. A 3.4% total solids aqueous slurry of freshly prepared calcium phosphate is added after the first addition of an aqueous solution of a mixture of sodium hydroxide and potassium hydroxide. The product obtained is a calcium fortified aqueous protein material.

EXAMPLE 4

An acid precipitated protein curd as prepared per Example 1 is diluted to 18% total solids. The contents are heated to above 100° F. Bromelain enzyme at 0.015% of the total solids is added and the contents are mixed. Added to the diluted curd is an aqueous blend of sodium hydroxide and potassium hydroxide to adjust the pH to 8.4. A 3.4% total solids of an aqueous slurry of freshly prepared calcium phosphate is added and the contents are maintained at above 100° F. for 20 minutes. The contents are pasteurized at 265° F. for 9 seconds. Added is an additional bromelain enzyme at 0.015% of the total solids and the contents are stirred for 35 minutes. The contents are pasteurized at 305° F. or 9 seconds to give a calcium fortified aqueous protein material

EXAMPLE 5

An acid precipitated protein curd as prepared per Example 1 is diluted to 14.5% total solids. The contents are heated to above 100° F. Added to the diluted curd is an aqueous blend of sodium hydroxide and potassium hydroxide to adjust the pH to 7.2. A 3.4% total solids of an aqueous slurry of freshly prepared calcium phosphate is added and the contents are maintained at above 100° F. The contents are pasteurized at 308° F. for 9 seconds. Added is an additional amount of sodium hydroxide and potassium hydroxide at 125° F. to adjust the pH to 9.0 and the contents are stirred. Alcalase at 0.02% of the total solids and bromelain at 0.015% of the total solids is added and the contents are stirred at above 100F for 22 minutes. The enzyme contents are adjusted to a pH of 7.2 with hydrochloric acid. The contents are pasteurized at 305° F. or 9 seconds to give a calcium fortified aqueous protein material.

Acid Beverage Compositions

Examples A-D are baseline process examples of acid beverage compositions as defined within FIG. 1. The acid beverage compositions of these examples employ a dry protein as a protein source.

EXAMPLE A

A 6.5 g protein per 8 oz serving fortified juice beverage is made using Supro® Plus 675 made by Solae® LLC.

Added to a vessel are 5494 g of distilled water followed by 332 g of Supro Plus 675. The contents at 5.70% solids are dispersed under medium shear, mixed for 5 minutes, followed by heating to 170° F. for 10 minutes to give a protein suspension slurry. In a separate vessel, 60 grams of pectin (YM-100L) are dispersed into 2940 grams of distilled water under high shear to give a 2% pectin dispersion. The dispersion is heated to 170° F. until no lumps are observed. The pectin dispersion is added into the protein suspension slurry and mixed for 5 minutes under medium shear. This is followed by the addition of 27 grams of citric acid, 27 grams of phosphoric acid, 210 grams of concentrated apple juice and 1000 grams of sugar. The contents are mixed for 5 minutes under medium shear. The pH of this mixture at room temperature is in the range of 3.8-4.0. The contents are pasteurized at 195° F. for 30 seconds, and homogenized at 2500 pounds per square inch in the first stage and 500 pounds per square inch in the second stage to give a protein stabilized acid beverage. Bottles are hot filled with the beverage at 180-185° F. The bottles are inverted, held for 2 minutes and then placed in ice water to bring the temperature of the contents to about room temperature. After the contents of the bottles are brought to about room temperature, the bottles are stored at room temperature for 6 months.

EXAMPLE B

The procedure of Example A is repeated except that the protein Supro® Plus 675 is replaced with the protein FXP 950 made by Solae® LLC.

EXAMPLE C

The procedure of Example A is repeated except that the protein Supro® Plus 675 is replaced with the protein FXP HO120 made by Solae® LLC.

EXAMPLE D

The procedure of Example A is repeated except that the protein Supro® Plus 675 is replaced with the protein Supro® XT 40 made by Solae® LLC.

The invention having been generally described above, may be better understood by reference to the examples described below. The following examples represent specific but non-limiting embodiments of the present invention.

Once components (A), (B) and (C) or ($C^1$) are prepared, all that remains is to combine the components to form the acid beverage composition according to the three processes. For the first process, a preblend (I) is prepared by combining (A) and (B). Preblend (I) is further combined with (C) followed by pasteurization and homogenization to form the acid beverage composition. After hydration of the stabilizing agent slurry, Component (A), is complete. The flavoring material, Component (B), is added to Component (A) to form preblend (I). It is necessary in the present invention to keep preblend (I) at a pH lower than 7 to prevent the stabilizing agent being degraded by beta-elimination. To this end, the pH of preblend (I) is maintained at between 2.0-5.5. The (A):(B) weight ratio for forming preblend (I) is generally from 65-73:27-32, preferably from 65-75:25-35 and most preferably from 60-80:20-40. The preblend (I):(C) for forming the acid beverage composition by the first process is generally from 55-75:25-45, preferably from 60-70:30-40 and most preferably from 62-68:32-38.

In the second process, in addition to forming preblend (I) by combining (A) and (B), a preblend (II) is formed by combining (A) and (C). Preblend (I) and preblend (II) are combined followed by pasteurization and homogenization to form the acid beverage composition. The (A):(B) weight ratio for forming preblend (I) is generally from 65-73:27-32, preferably from 65-75:25-35 and most preferably from 60-80:20-40. The (A):(C) weight ratio for forming preblend (II) is generally from 25-35:65-75, preferably from 20-30:70-80 and most preferably from 15-25:75-85. Further, the preblend (I):preblend (II) weight ratio is generally from 25-55:45-75, preferably from 30-50:50-70 and most preferably from 35-45:55-65.

For the third process, a preblend (III) is prepared by combining (A) and ($C^1$). Component ($C^1$) is a non-pasteurized aqueous protein slurry. Preblend (III) is further combined with (B), followed by pasteurization and homogenization. The (A):($C^1$) weight ratio for forming preblend (III) is generally from 45-70:30-55, preferably from 50-65:35-50 and most preferably from 55-60:40-45. Further, the preblend (III):(B) weight ratio is generally from 70-95:5-30, preferably from 75-90:10-25 and most preferably from 80-85:15-20.

Preblend (I) and Component (C) are blended together as per the first process. Preblend (I) and preblend (II) are blended together as per the second process. Preblend (III) and Component ($C^1$) are blended together as per the third process. The blend, irrespective of its process, has a pH of from 3.0-4.5, preferably from 3.5-4.2 and most preferably from 3.8-4.0 and is subjected to a sterilization or pasteurization step by heating either blend at a relatively high temperature for a short period of time. This pasteurization step kills microorganisms in the blend. For example, an effective treatment for killing microorganisms in the blend involves heating the blend to a temperature of about 180° F. for about 10 seconds, preferably to a temperature of at least 190° F. for at least 30 seconds and most preferably at a temperature of 195° F. for 60 seconds. While a temperature lower than 180° F. may work, a temperature of at least 180° F. provides a safety factor. Temperatures greater than 200° F. also have an effect on the killing of microorganisms. However, the cost associated with the higher temperature does not translate to a product that contains appreciably fewer harmful microorganisms. Further, pasteurizing at too high a temperature for too long a period of time may cause the protein to further denature, which generates more sediment due to the insolubility of the further denatured protein.

Homogenization serves to decrease the particle size of the protein in the blend. Either blend is transferred to a Gaulin homogenizer (model 15MR) and is homogenized in two stages, a high pressure stage and a low pressure stage. The high pressure stage is from 1500-5000 pounds per square inch and preferably from 2000-3000 pounds per square inch. The low pressure stage is from 300-1000 pounds per square inch and preferably from 400-700 pounds per square inch.

The blend, by either process, has a pH of from 3.0-4.5, preferably from 3.2-4.0 and most preferably from 3.6-3.8. The bottles are hot filled, inverted for 2 minutes and then placed in ice water to bring the temperature of the contents to about room temperature. The bottles are stored and particle size and viscosity values are determined at 1 month. Sediment values are determined at 1, 4 and 6 months.

Examples 6-9 are directed to the preparation of a stabilized acid beverage composition using Component (C) of Examples 2-5 and Components (A) and (B) as shown within the third process as defined within FIG. 4.

EXAMPLE 6

A 6.25 g protein per 8 oz serving fortified juice beverage is made using the aqueous protein slurry of Example 2.

Added to a vessel are 2695 g of de-ionized water and 55 g pectin (YM-100L). The contents are stirred at 170° F. for 5 minutes and then cooled to room temperature. The pectin slurry is added to 2360 g of an aqueous protein slurry as prepared in Example 2 followed by 1 kg sucrose and mixed for 5 minutes. Added are 210 grams of apple juice concentrate and 27 grams of citric acid and the pH is adjusted to 3.8-4.0 with phosphoric acid. The contents are pasteurized at 195° F. for 30 seconds, and homogenized at 2500 psi in the first stage and 500 psi in the second stage to give a protein stabilized acid beverage. Bottles are hot filled with the beverage at 180-185° F. The bottles are inverted, held for 2 minutes and then placed in ice water to bring the temperature of the contents to about room temperature. After the contents of the bottles are brought to about room temperature, the bottles are stored and evaluated for sediment.

EXAMPLE 7

A 6.25 g protein per 8 oz serving fortified juice beverage is made using the aqueous protein slurry of Example 3 following the procedure of Example 6.

EXAMPLE 8

A 6.25 g protein per 8 oz serving fortified juice beverage is made using the aqueous protein slurry of Example 4 following the procedure of Example 6.

EXAMPLE 9

A 6.25 g protein per 8 oz serving fortified juice beverage is made using the aqueous protein slurry of Example 5 following the procedure of Example 6.

The baseline process beverage Examples A, B, C and D and the inventive process beverage examples 6, 7, 8 and 9 are compared to each other, protein for protein, in storage sediment values in Table I. Inventive Example 6 is compared to baseline Example A; inventive Example 7 is compared to baseline Example B; inventive Example 8 is compared to baseline Example C; and inventive Example 9 is compared to baseline Example D.

TABLE I

| | % Storage Sediment Values | | | | | |
|---|---|---|---|---|---|---|
| | One Month | | Four Months | | Six Months | |
| Example | 4° C. | 25° C. | 4° C. | 25° C. | 4° C. | 25° C. |
| A | 5.7 | 7.0 | 6.4 | 7.3 | NA | 11.0 |
| 6 | 0.8 | 1.2 | 1.1 | 2.1 | 2.2 | 3.2 |
| B | 6.3 | 5.9 | NA | NA | 10.0 | 11.6 |
| 7 | 0.5 | 0.6 | 1.1 | 1.6 | 1.1 | 2.1 |
| C | 1.1 | 2.7 | 7.6 | 9.6 | 9.0 | 13.2 |
| 8 | 0.0 | 0.0 | 0.0 | 1.2 | 1.2 | 4.9 |
| D | 3.4 | 3.3 | 5.5 | 6.2 | 6.4 | 8.7 |
| 9 | 2.1 | 0.5 | 2.2 | 3.3 | 5.4 | 6.6 |

It is observed from the storage sediment data of the above examples that the embodiments encompassing the process of this invention offer an improvement in less sediment in preparing a protein based acid beverage over the normal process for preparing the beverage.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. An acid beverage composition, consisting essentially of;
   (A) a hydrated protein stabilizing agent consisting essentially of a high methoxyl pectin;
   (B) at least one flavoring material comprising a fruit juice, a vegetable juice, citric acid, malic acid, tartaric acid, lactic acid, ascorbic acid, glucono delta lactone or phosphoric acid; and
   (C) a slurry of an aqueous protein material wherein the slurry of the aqueous protein material is prepared by a process, comprising;
      (1) preparing an aqueous extract from a protein containing material,
      (2) adjusting the pH of the aqueous extract to a value of from about 4 to about 5 to precipitate the protein material, (3) separating the precipitated protein material and forming a suspension of the precipitated protein material in water, (4) adjusting the pH of the suspension to a value of from about 4.0 to about 6.0 to form a slurry of an aqueous protein material, wherein the slurry is not subjected to spray drying, and optionally (5) pasteurizing, the slurry of the aqueous protein material; wherein the acid beverage composition has a pH of from 3.0 to 4.5.

2. The composition of claim 1 wherein the protein stabilizing agent (A) is present at from 0.5-5% by weight of the total composition.

3. The composition of claim 1 wherein the pH of the protein stabilizing agent (A) is from 2.0-5.5.

4. The composition of claim 1 wherein the protein material (C) comprises a soybean protein material, casein, whey protein, wheat gluten or zein.

5. The composition of claim 4 wherein the soybean protein material comprises a soy flour, soy concentrate or soy protein isolate.

6. The composition of claim 5 wherein the soybean protein material comprises a soy protein isolate.

7. The composition of claim 1 wherein the protein material (C) comprises a hydrolyzed protein material or a non-hydrolyzed protein material.

8. The composition of claim 7 wherein the protein material (C) comprises a hydrolyzed protein material.

9. The composition of claim 1 wherein the pH of the acid beverage composition is from 3.2-4.0.

10. The composition of claim 1 wherein the pH of the acid beverage composition is from 3.6-3.8.

* * * * *